No. 801,347. PATENTED OCT. 10, 1905.
F. H. TREAT.
WATER COOLED FURNACE VALVE.
APPLICATION FILED SEPT. 6, 1902.

5 SHEETS—SHEET 1.

WITNESSES
INVENTOR
F. H. Treat
by Bakewell & Byrnes
his Attorneys

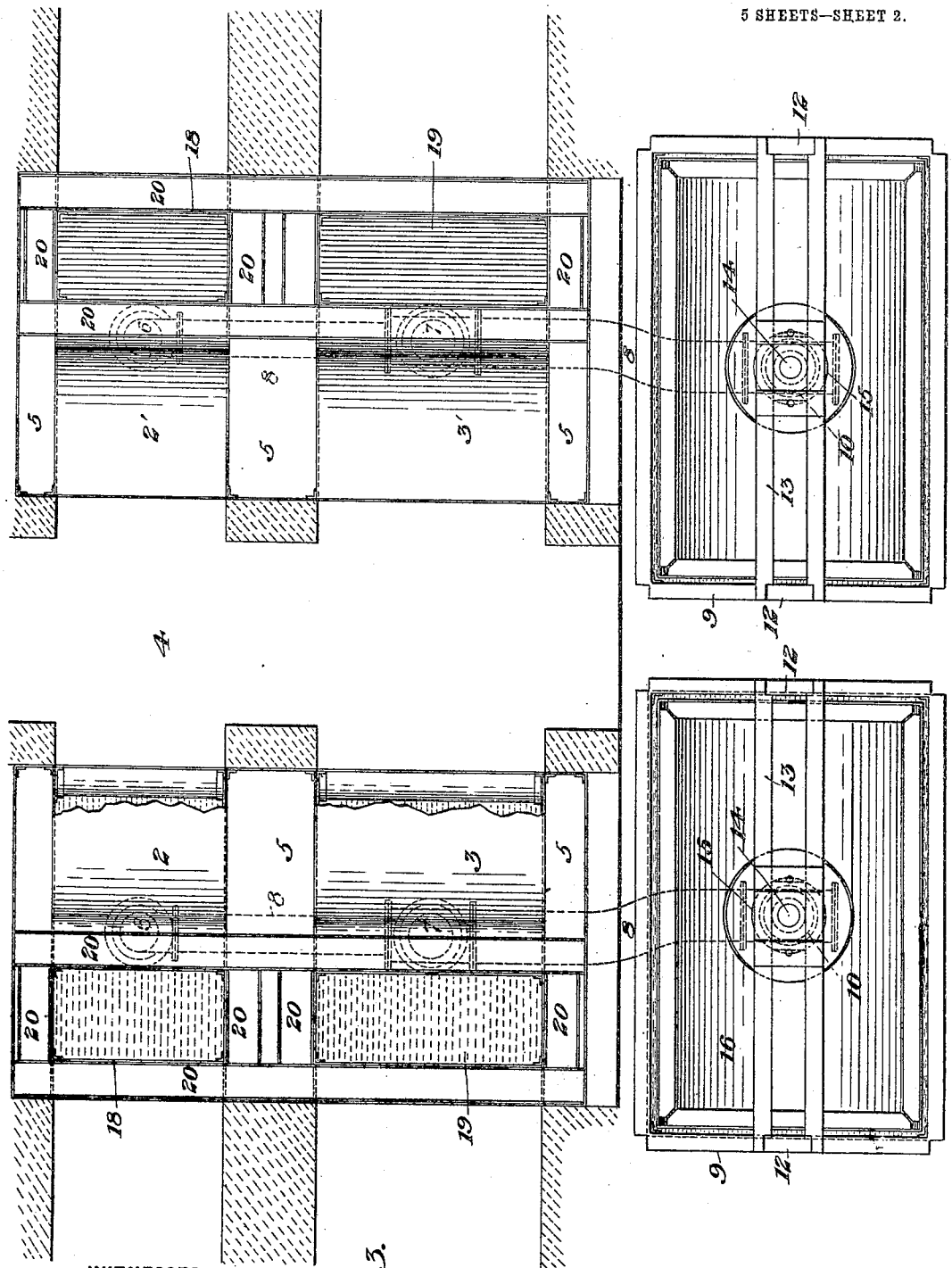

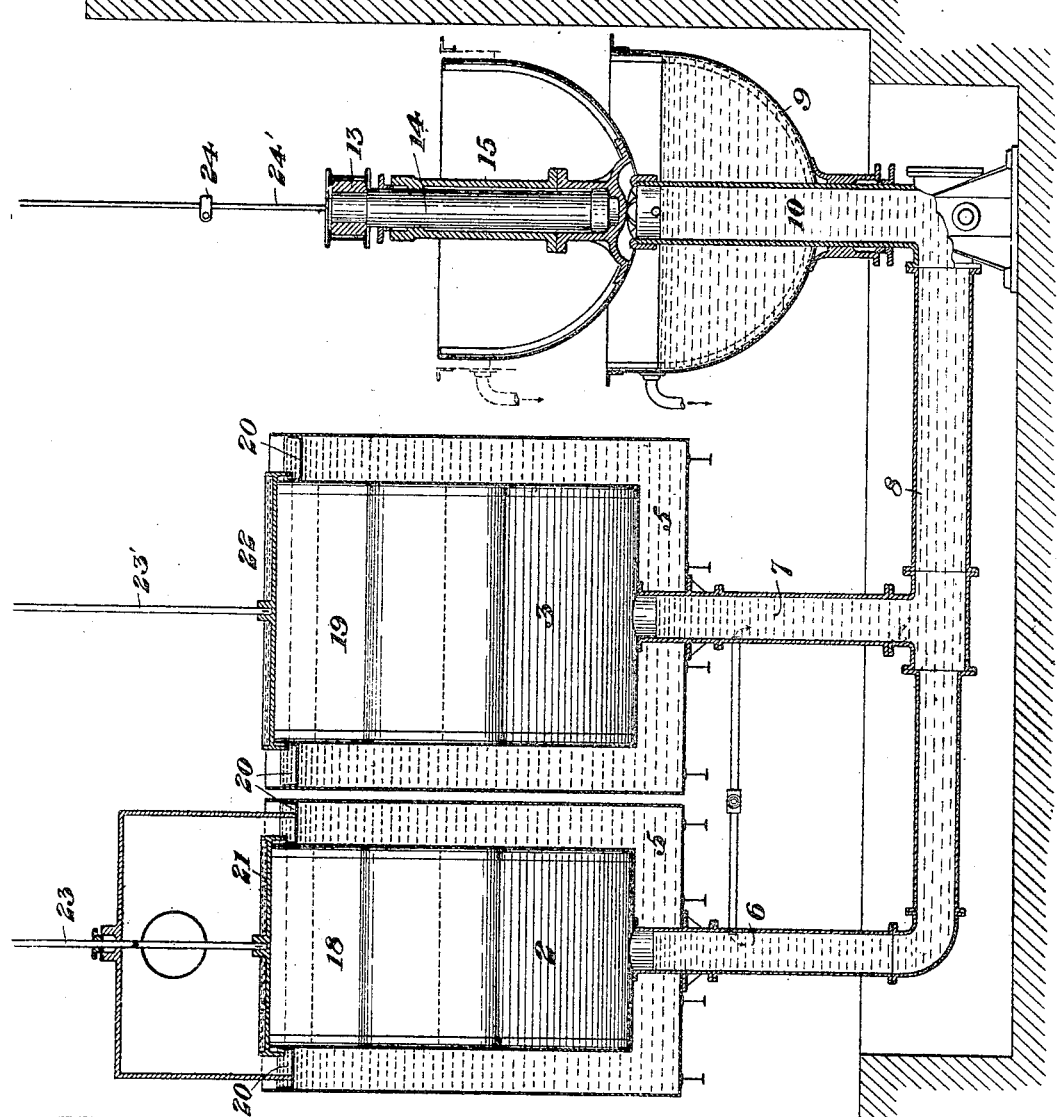

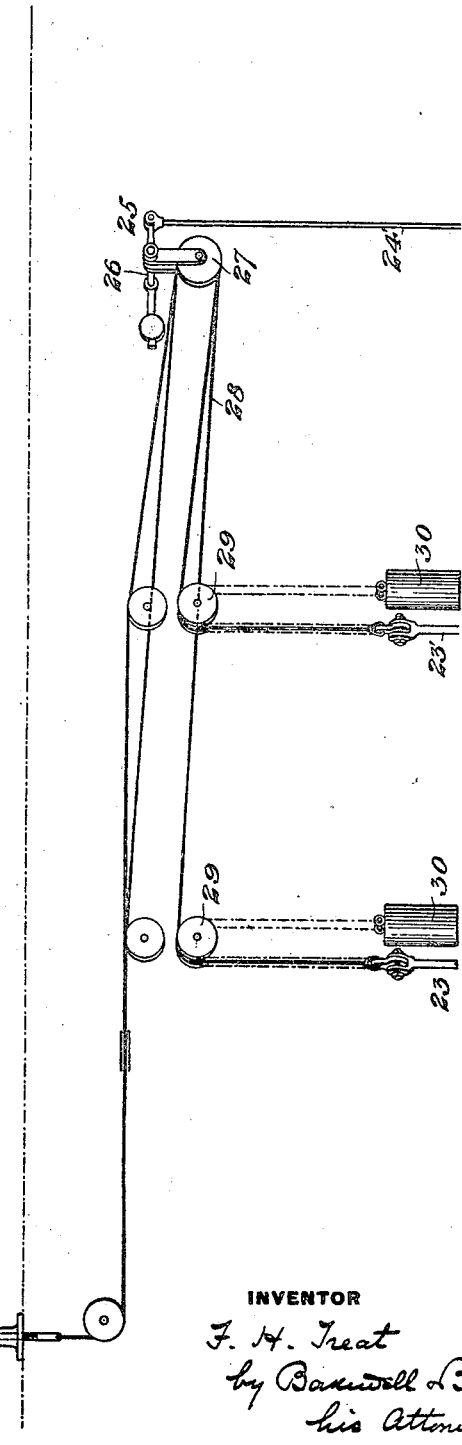

No. 801,347. PATENTED OCT. 10, 1905.
F. H. TREAT.
WATER COOLED FURNACE VALVE.
APPLICATION FILED SEPT. 6, 1902.

5 SHEETS—SHEET 5.

WITNESSES

INVENTOR
F. H. Treat
by Bakewell & Byrnes
his Attorneys

UNITED STATES PATENT OFFICE.

FRANCIS H. TREAT, OF PITTSBURG, PENNSYLVANIA.

WATER-COOLED FURNACE-VALVE.

No. 801,347.  Specification of Letters Patent.  Patented Oct. 10, 1905.

Application filed September 6, 1902. Serial No. 122,410.

*To all whom it may concern:*

Be it known that I, FRANCIS H. TREAT, of Pittsburg, Allegheny county, Pennsylvania, have invented a new and useful Water-Cooled Furnace-Valve, of which the following is a full, clear, and exact description, reference being had to the accompanying drawings, forming part of this specification, in which—

Figure 2:
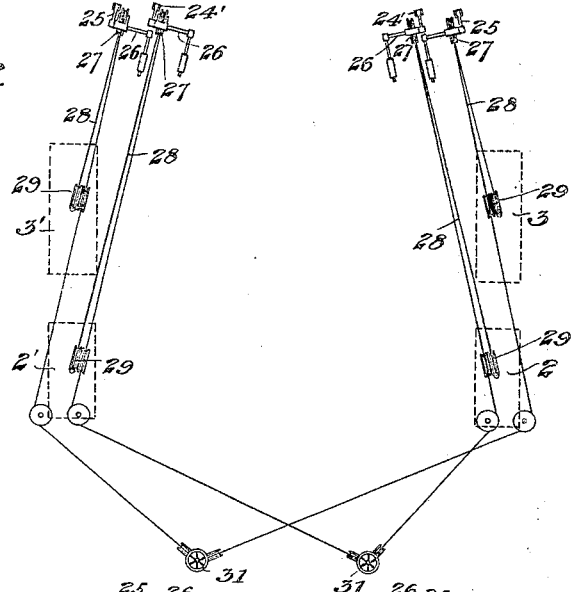
Figure 1:
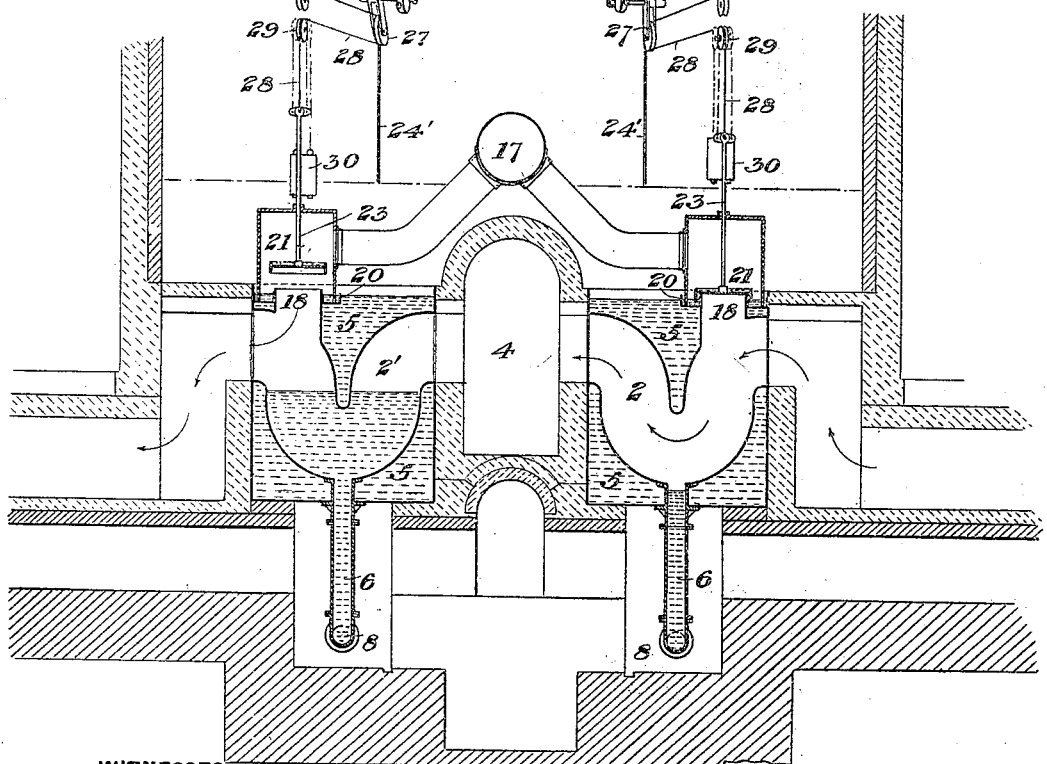
Figure 5:
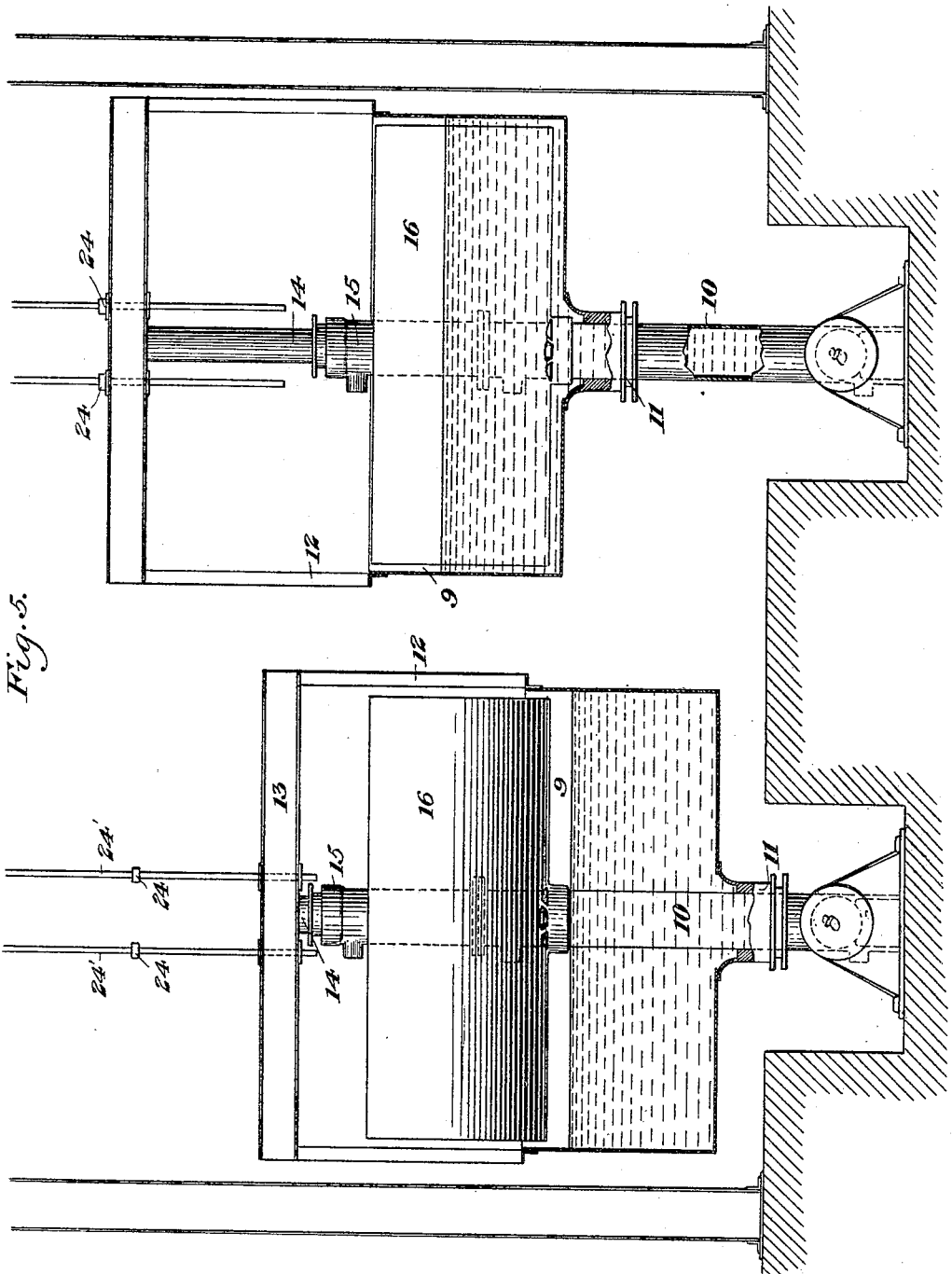

Figure 1 is a vertical section showing the gas-valves. Fig. 2 shows in diagram the operating connections of the air and gas valves. Fig. 3 is a top plan view of the gas and air valves, partly in section. Fig. 4 is a cross-section on the line IV IV of Fig. 3. Fig. $4^a$, which should be read in connection with Fig. 4, shows the operating connections for the valves. Fig. 5 is a side view of the water-displacers, partly in vertical section, showing the positions which they occupy when one valve is open and the other closed.

My invention is designed to provide a new water-cooled valve, and is especially designed for use in regenerative valve systems, though it may be applied to other purposes. My valve system is operated by raising or lowering the water-level in traps by means of an independent displacer, and all the parts of the valves are water-cooled, so that they are not apt to be injured by heat or by non-uniform expansion and contraction of the parts. The valves are also adapted to be operated automatically and in unison when they are shifted in reversal.

In the drawings, 2 and 3 are U-shaped pipes or traps arranged on either side of a stack-flue 4. Each one of these traps is submerged in a water-containing box 5, the two legs of the trap opening through opposite sides of the box. Suitable connections are employed for preserving a water-level in the boxes, so that the water surrounds the traps on all sides. I prefer to arrange the traps in pairs, 2 2' being the gas-valves and 3 3' being the air-valves. The valve-traps are connected by pipes 6 and 7 with a fluid-supply pipe 8. The supply-pipe 8 is fed from a tank 9 through a telescopically-arranged pipe connection. One of the parts of said pipe connection—viz, the pipe 10 and the displacer—is stationary and the other, the tank 9, is movable vertically. The water enters the pipe 10 through its upper end, and the tank is provided with a stuffing-box 11. The tank 9 is raised and lowered by the straps 12 of a cross-head 13, secured to a suitable motor, preferably consisting of a vertically-reciprocating plunger 14, which is operated hydraulically or in any other suitable manner in a cylinder 15. 16 is a displacer, which is preferably set around the cylinder 15 and is adapted when the tank is raised to displace water from the tank into the pipes and traps, in which the water-level is necessarily uniform with the water-level in the tank. This displacer is so proportioned and shaped as to volume that by reason of a constant supply of water to the tank and a constant overflow from the same the water-level in the tank will remain uniform as it is raised and lowered and the pressure also remains the same. The motive cylinder 15 may be supported on top of the pipe 10, and constant communication between the tank 9 and the pipe 8 is afforded. The left part of Fig. 5 shows the low water-level in the tank when the tank is lowered below the displacer, and the right side of Fig. 5 shows the high water-level when the tank is raised.

Each pair of valves 2 3 and 2' 3' has a tank and displacer with which they are in communication, and the sets of tanks and displacers are preferably operated alternately, so that when the water-level is raised to close one pair of valves 2' 3', as shown at the valve 2' in Fig. 1, it will be lowered to open the other pair of valves 2 3. When the valves are open, the gases are allowed to pass from the furnace, through the valves 2 and 3, to the stack-flue.

The gas comes from a main 17, and the air and gas respectively enter the traps through upwardly-extending ports 18 and 19, which are sealed by annular water-channels 20, which are in communication with the water-box 5 or otherwise supplied with water. The volume of the gas and air entering these ports is regulated by cap-valves 21 and 22, which are water-cooled on their upper surfaces and have flanges which are adapted to enter the water-channels 20. They are operated by rods 23 23', which are actuated by the displacer-plungers 14. The cross-heads 13 of these plungers when they rise engage tappets 24 on rods 24', connected by a rocker-arm 25 with a rock-shaft 26, carrying pulleys 27, from which operating chains or ropes 28 pass over sheaves 29 to the valve-rods 23 23'. The valves are counterweighted by weights 30. The extent of opening of the valves may be regulated by adjusting mechanism 31, which varies the slack of the operating-ropes. I am thus enabled to actuate the admission-valves automatically in unison with the trap-valves whenever the water is raised or lowered in the latter, and the connections are so arranged that as the displacers are operated to close the trap-valves the trap-valves will be sealed and closed before the air and gas valves are opened, thus preventing the gas from passing to the stack during the shifting of the valve, and correspondingly when the trap-valves are being opened by lowering of the water-level the gas and air regulating valves will first be closed.

The advantages of my invention result from the simple and effective arrangement for raising and lowering the water in the trap by an independent displacer, from the surrounding of the traps with water, which prevents their warping and cracking when subjected to heat, and from the automatic system for actuating the admission-valves. The amount of entering air and gas is easily changed and when set or adjusted will automatically open to a predetermined point, while no gas is allowed to pass the stack during the reversing.

Within the scope of my broader claims the valve may be used for other purposes than in a reversing regenerative system, and many changes may be made in the form and arrangement of the parts and their actuating connections.

I claim—

1. A furnace trap-valve comprising a trap, a hollow diaphragm extending into said trap, a container for surrounding the trap with water, and a water connection for admitting water to said container and to said hollow diaphragm, substantially as described.

2. A furnace-valve having a trap, a vertically-movable tank connected to said trap, a displacer, and a constant-supply connection and an overflow arranged to cause a circulation of water in the trap and tank, substantially as described.

3. A valve comprising a trap, a water-tank, a displacer, a pipe leading from the trap to the tank, and means for raising and lowering the tank to vary the level of the water in the trap; substantially as described.

4. A trap-valve having a gas or air inlet provided with an admission-valve, a tank connected to said valve, a displacer in the tank, mechanism for raising and lowering the tank, and mechanism for operating the admission-valve; substantially as described.

5. A furnace-valve having a trap, a gas or air inlet provided with an admission-valve, mechanism for raising and lowering the level of water in the trap to close and open the same, and connections arranged to close the admission-valve in advance of the opening of the trap and to open it after the trap has been closed, substantially as described.

6. A furnace-valve structure having a trap and an air or gas inlet port, said valve structure being surrounded externally by water and having a water connection admitting water to the interior of the trap, means for varying the water-level in the trap, a movable valve for said gas or air inlet port, and a water seal for said valve, substantially as described.

7. A furnace-valve having a trap and an air or gas inlet valve, mechanism for raising and lowering the level of water in the trap, an admission-valve for the gaseous inlet, mechanism for adjusting the amount of movement of said inlet-valve, and connections arranged to automatically shift the inlet-valve when the level of water in the trap is changed; substantially as described.

8. A trap-valve having a pipe connection leading to a water-tank, a stationary displacer above the tank, and means for moving the tank to and from the displacer; substantially as described.

9. A trap-valve having an air or gas admission valve, a pipe leading from the trap-valve to a tank, a motor arranged to change the level of the water in the tank and valve, and a tappet system actuated by the motor and arranged to shift the admission-valve; substantially as described.

In testimony whereof I have hereunto set my hand.

FRANCIS H. TREAT.

Witnesses:
H. M. CORWIN,
L. M. REDMAN.